(12) United States Patent
Yoshioka et al.

(10) Patent No.: US 12,406,990 B2
(45) Date of Patent: Sep. 2, 2025

(54) SOLID-STATE BATTERY

(71) Applicant: Murata Manufacturing Co., Ltd., Nagaokakyo (JP)

(72) Inventors: Makoto Yoshioka, Nagaokakyo (JP); Kenji Oshima, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 624 days.

(21) Appl. No.: 17/664,323

(22) Filed: May 20, 2022

(65) Prior Publication Data

US 2022/0285682 A1    Sep. 8, 2022

Related U.S. Application Data

(63) Continuation of application No. PCT/JP2020/044673, filed on Dec. 1, 2020.

(30) Foreign Application Priority Data

Dec. 4, 2019    (JP) .................................. 2019-219533

(51) Int. Cl.
*H01M 4/58* (2010.01)
*H01M 4/04* (2006.01)
(Continued)

(52) U.S. Cl.
CPC .......... *H01M 4/58* (2013.01); *H01M 4/0407* (2013.01); *H01M 10/052* (2013.01);
(Continued)

(58) Field of Classification Search
CPC .... H01M 4/58; H01M 4/0407; H01M 10/052; H01M 2004/027; H01M 2004/028;
(Continued)

(56) References Cited

U.S. PATENT DOCUMENTS

| | | | | |
|---|---|---|---|---|
| 2013/0149592 A1* | 6/2013 | Hayashi | ............. | H01M 50/512 429/160 |
| 2018/0294470 A1 | 10/2018 | Hasegawa et al. | | |

(Continued)

FOREIGN PATENT DOCUMENTS

| | | |
|---|---|---|
| JP | 2006351326 A | 12/2006 |
| JP | 2008186595 A | 8/2008 |

(Continued)

OTHER PUBLICATIONS

International Search Report in PCT/JP2020/044673, mailed Jan. 19, 2021, 2 pages.

*Primary Examiner* — Matthew T Martin
*Assistant Examiner* — Felicity B Alban
(74) *Attorney, Agent, or Firm* — ArentFox Schiff LLP

(57) ABSTRACT

A solid-state battery having two or more stacked battery elements, each battery element including one or more battery constituent units in which a positive electrode layer and a negative electrode layer oppose each other with a solid electrolyte layer between the positive electrode layer and the negative electrode layer; and an insulating layer interposed between adjacent battery elements of the two or more stacked battery elements, wherein at least one end portion of the insulating layer has a thickness greater than a thickness of a central portion of the insulating layer in a sectional view thereof.

18 Claims, 8 Drawing Sheets

(51) Int. Cl.
　　　*H01M 10/052*　　　(2010.01)
　　　*H01M 4/02*　　　　(2006.01)
(52) U.S. Cl.
　　　CPC ............... *H01M 2004/027* (2013.01); *H01M 2004/028* (2013.01); *H01M 2300/0071* (2013.01)
(58) Field of Classification Search
　　　CPC . H01M 2300/0071; H01M 2300/0068; H01M 10/0585; H01M 50/471; H01M 50/497; H01M 10/0562; Y02E 60/10; Y02P 70/50
　　　See application file for complete search history.

(56) References Cited

U.S. PATENT DOCUMENTS

| | | |
|---|---|---|
| 2019/0319252 A1 | 10/2019 | Hasegawa et al. |
| 2020/0303781 A1 | 9/2020 | Baba |
| 2022/0077546 A1* | 3/2022 | Koga .................. H01M 50/512 |
| 2022/0209338 A1* | 6/2022 | Chikagawa ......... H01M 50/141 |

FOREIGN PATENT DOCUMENTS

| | | |
|---|---|---|
| JP | 2016001600 A | 1/2016 |
| JP | 2016001601 A | 1/2016 |
| JP | 2018181461 A | 11/2018 |
| JP | 2019186102 A | 10/2019 |
| WO | 2019167821 A1 | 9/2019 |

* cited by examiner

FIG. 7 - PRIOR ART

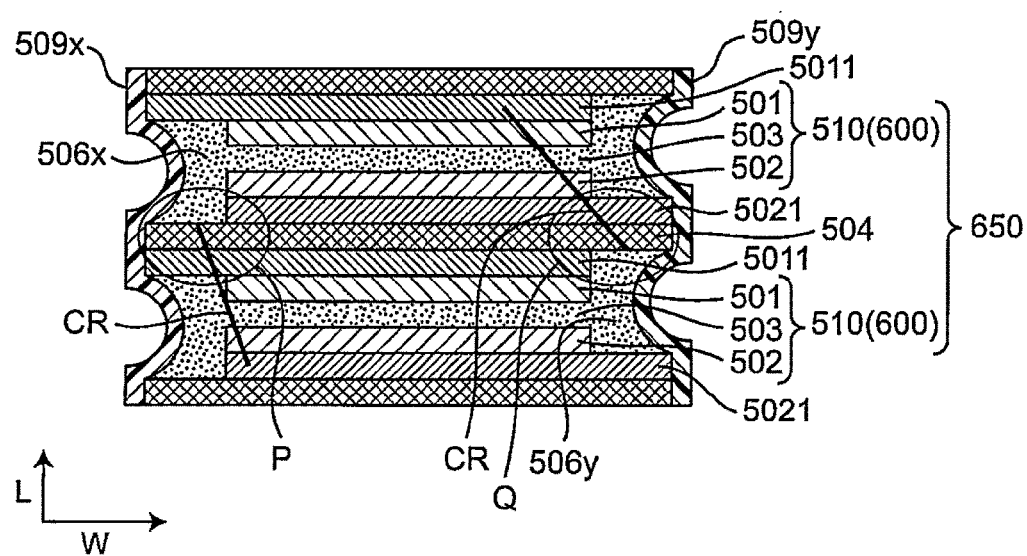
FIG. 8 - PRIOR ART

SOLID-STATE BATTERY

CROSS REFERENCE TO RELATED APPLICATIONS

The present application is a continuation of International application No. PCT/JP2020/044673, filed Dec. 1, 2020, which claims priority to Japanese Patent Application No. 2019-219533, filed Dec. 4, 2019, the entire contents of each of which are incorporated herein by reference.

FIELD OF THE INVENTION

The present invention relates to a solid-state battery.

BACKGROUND OF THE INVENTION

The demand for batteries as power sources for portable electronic devices such as mobile phones and portable personal computers has been greatly expanded in recent years. In batteries used for such applications, an electrolyte (electrolytic solution) such as an organic solvent has been conventionally used as a medium for moving ions. However, the battery having the above configuration has a risk of leaking of the electrolytic solution. The organic solvent or the like used in the electrolytic solution is a flammable substance. Therefore, it is required to enhance the safety of the battery.

To enhance the safety of the battery, a solid-state battery including a solid electrolyte as an electrolyte instead of an electrolytic solution has been studied (for example, Patent Documents 1 to 3).

Patent Document 1: Japanese Patent Application Laid-Open No. 2008-186595

Patent Document 2: Japanese Patent Application Laid-Open No. 2006-351326

Patent Document 3: Japanese Patent Application Laid-Open No. 2016-001601

SUMMARY OF THE INVENTION

The inventors of the present invention have found that a problem of cracking occurs in the solid-state battery as illustrated in FIGS. 7 and 8. Specifically, the solid-state battery includes two or more battery elements (600) each including a battery constituent unit 510 including a positive electrode layer 501 (which may have a positive electrode current collecting layer 5011) and a negative electrode layer 502 (which may have a negative electrode current collecting layer 5021) opposing each other and a solid electrolyte layer 503 disposed between the positive electrode layer and the negative electrode layer, the two or more battery elements (600) being stacked with an insulating layer 504 interposed between adjacent battery elements 600 in a stacking direction L of each layer constituting the battery constituent unit. Two opposite side faces of the stacked body are respectively provided with end face electrodes 509$x$, 509$y$ electrically connected to the positive electrode layer 501 or the negative electrode layer 502. As illustrated in FIGS. 7 and 8, the insulating layer 504 has a uniform thickness in a section view perpendicular to the end face electrodes 509$x$, 509$y$ and the insulating layer 504.

In such a conventional solid-state battery as illustrated in FIGS. 7 and 8, when the electrode layer (that is, the negative electrode layer) 502 immediately over the insulating layer 504 between the battery elements 600 has a polarity (that is, a negative polarity) different from the polarity of the electrode layer (that is, the positive electrode layer) 501 immediately under the insulating layer 504, a crack CR may occur from an end portion in a width direction W of the insulating layer 504. Such generation of a crack from the insulating layer 504 is considered to be caused by a change in composition in the width direction W on one of the upper face (or the upper face side) and the lower face (or the lower face side) of the end portion of the insulating layer 504. More specifically, in the vicinity P of the left end portion of the insulating layer 504, the lower surface side of the insulating layer 504 is formed of a material having one kind of composition (Positive electrode layer 501, especially the positive electrode current collecting layer 5011), whereas the upper face side is formed of a material having two kinds of compositions (the negative electrode layer 502 (especially the negative electrode current collecting layer 5021) and a side face reinforcing part 506$x$ adjacent in the width direction W), and a member having the smallest contact area with the upper face or the lower face of the insulating layer 504 in the vicinity is the side face reinforcing part 506$x$. For this reason, it is considered that stress (or load) tends to concentrate on the interface between the insulating layer 504 and the side face reinforcing part 506$x$, peeling (or separation) tends to occur, and the crack CR tends to occur. On the other hand, in a vicinity Q of the right end portion of the insulating layer 504, the upper face side of the insulating layer 504 is formed of a material having one kind of composition (the negative electrode layer 502, especially the negative electrode current collecting layer 5021), whereas the lower face side is formed of a material having two kinds of compositions (the positive electrode layer 501 (especially the positive electrode current collecting layer 5011) and a side face reinforcing part 506$y$ adjacent in the width direction W), and a member having the smallest contact area with the upper face or the lower face of the insulating layer 504 in the vicinity is the side face reinforcing part 506$y$. For this reason, it is considered that stress (or load) tends to concentrate on the interface between the insulating layer 504 and the side face reinforcing part 506$y$, peeling (or separation) tends to occur, and the crack CR tends to occur. When the crack is generated, the battery capacity decreases, which leads to deterioration of the battery characteristics. Each of FIGS. 7 and 8 is a schematic sectional view of an example of a conventional solid-state battery for explaining a crack generated in a conventional technology.

An object of the present invention is to provide a solid-state battery in which two or more battery elements are stacked with an insulating layer interposed therebetween, the battery elements each including a battery constituent unit in which a positive electrode layer, a negative electrode layer, and a solid electrolyte layer are stacked, in which a generation of a crack from an end portion of the insulating layer is more sufficiently prevented.

The present invention relates to a solid-state battery including two or more stacked battery elements, each battery element including one or more battery constituent units in which a positive electrode layer and a negative electrode layer oppose each other with a solid electrolyte layer between the positive electrode layer and the negative electrode layer; and an insulating layer interposed between adjacent battery elements of the two or more stacked battery elements, wherein at least one end portion of the insulating layer has a thickness greater than a thickness of a central portion of the insulating layer in a sectional view thereof.

The solid-state battery of the present invention can more sufficiently prevent a generation of a crack from an end portion of an insulating layer disposed between battery elements.

BRIEF EXPLANATION OF THE DRAWINGS

FIG. 7 is a schematic sectional view of an example of a conventional solid-state battery for explaining a crack generated in a conventional technology.

FIG. 8 is a schematic sectional view of an example of a conventional solid-state battery for explaining a crack generated in a conventional technology.

DETAILED DESCRIPTION OF THE INVENTION

Solid-State Battery

Figure 1A:
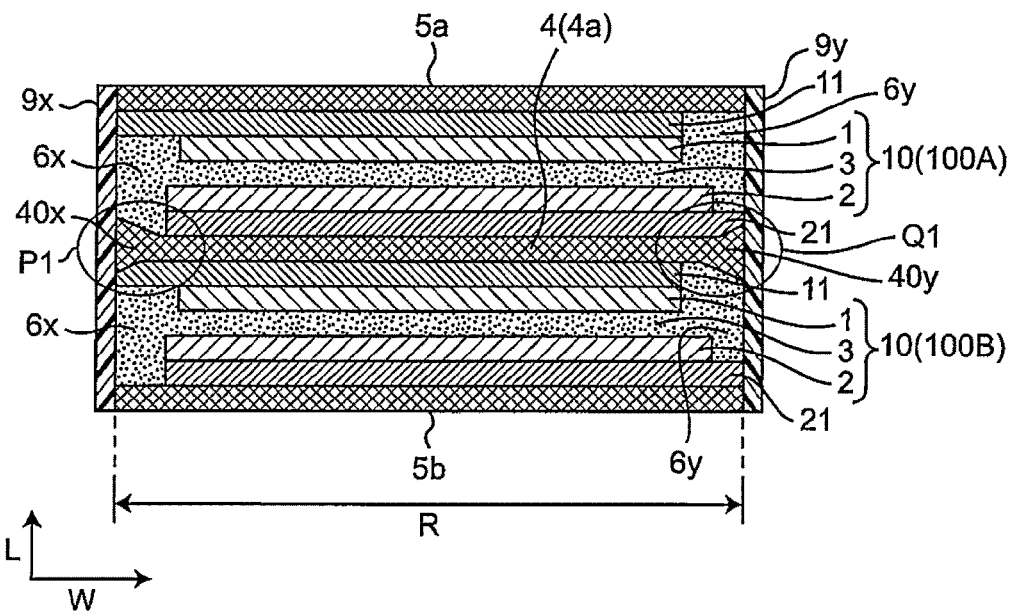
FIG. 1A is a schematic sectional view of a solid-state battery according to a first embodiment of the present invention.

The invention described herein is directed to a solid-state battery. The term "solid-state battery" in the present specification refers to a battery whose constituent elements (especially electrolyte layers) are formed of solids in a broad sense and refers to an "all-solid-state battery" whose constituent elements (especially all constituent elements) are formed of solids in a narrow sense. The term "solid-state battery" in the present specification encompasses a so-called "secondary battery" that can be repeatedly charged and discharged and a "primary battery" that can only be discharged. The "solid-state battery" is preferably a "secondary battery". The "secondary battery" is not excessively limited by its name, and may encompass, for example, an electrochemical device such as a "power storage device".

The term "plan view" in the present specification refers to a state (a top view or a bottom view) when an object is viewed from the upper side or the lower side along a thickness direction based on a stacking direction L of layers described later and constituting the solid-state battery. The term "section view" in the present specification refers to a sectional state (sectional view) when an object is viewed from a direction substantially perpendicular to the thickness direction based on the stacking direction L of layers described later and constituting the solid-state battery. The "vertical direction" and the "horizontal direction" used directly or indirectly in the present specification correspond to the vertical direction and the horizontal direction in the drawings, respectively. In particular, the "vertical direction" may be a "vertical direction" when it is assumed that the solid-state battery is mounted on a horizontal face of a substrate. Unless otherwise specified, the same reference symbols or signs indicate the same members or sites, or the same meanings. In a preferred aspect, it can be understood that the vertically downward direction (that is, the direction in which gravity acts) corresponds to the "downward direction", "lower face side", or "bottom face side", and the opposite direction corresponds to the "upward direction", "upper face side", or "top face side".

The solid-state battery of the present invention will be described based on the following embodiments.

First Embodiment

As illustrated in FIG. 1A, the solid-state battery of the present embodiment includes two or more battery elements (100 (100A, 100B)) each including one or more battery constituent units 10, the two or more battery elements being stacked with an insulating layer 4 interposed between adjacent battery elements 100 in a stacking direction L of each layer constituting the battery constituent units. The battery element 100 is a main body portions of the solid-state battery covered with a protective layer 5 (that is, 5a and 5b) and a side face reinforcing part 6 (that is, 6x and 6y) described later and include one or more battery constituent units 10. The battery constituent unit 10 means a minimum constituent unit capable of exhibiting a battery function and is formed by stacking one positive electrode layer 1 and one negative electrode layer 2 opposing each other and one solid electrolyte layer 3 disposed between the positive electrode layer 1 and the negative electrode layer 2. The positive electrode layer 1 may have a positive electrode current collecting layer 11 as described later, and in such a case, the positive electrode current collecting layer 11 forms a part of the positive electrode layer 1. The negative electrode layer 2 may have a negative electrode current collecting layer 21 as described later, and in such a case, the negative electrode current collecting layer 21 forms a part of the negative electrode layer 2. The stacking direction of the battery elements 100 (for example, 100A, 100B) is usually the same as the stacking direction L of the positive electrode layer 1, the negative electrode layer 2, and the solid electrolyte layer 3 in the battery constituent unit 10. When the battery element 100 includes two or more battery constituent units 10, the stacking direction of the battery constituent units 10 is also the same as the stacking direction L of each layer of a battery constituent unit 10.

The solid-state battery of the present embodiment further includes end face electrodes 9x, 9y electrically connected to the positive electrode layer or the negative electrode layer on two opposite side faces of a stacked body including the two or more battery elements 100 and the insulating layer 4 disposed therebetween. Specifically, the solid-state battery includes an end face electrode (that is, the positive end face electrode 9x) electrically connected to the positive electrode layer 1 on a first side face of the side faces of the stacked body including the two or more battery elements 100 and the insulating layer 4 disposed therebetween, and an end face electrode (that is, the negative end face electrode 9y) electrically connected to the negative electrode layer 2 on a second side face opposing the first side face. FIG. 1A is a schematic sectional view of a solid-state battery according to a first embodiment of the present invention and is a sectional view perpendicular to the two end face electrodes 9x and 9y and the insulating layer 4. In the present specification, unless otherwise specified, "a section view" and "a sectional view" respectively indicate a section view and a sectional view including the two end face electrodes 9x, 9y and the insulating layer 4. In particular, "a section view including the two end face electrodes 9x, 9y and the insulating layer 4" refers to "a section view perpendicular to the two end face electrodes 9x and 9y and the insulating layer 4" and is specifically refers to "a section view based on a plane orthogonal to the two end face electrodes 9x, 9y and the insulating layer 4".

In FIG. 1A, the solid-state battery includes two battery elements, but the solid-state battery is not limited thereto and may include two or more, for example, two to 100 battery elements. The two or more battery elements included in the solid-state battery may each independently include one or more, for example, one to 100 battery constituent units 10. In FIG. 1A, in order from the top, each of a first battery element 100A and a second battery element 100B includes only one battery constituent unit 10.

In the present embodiment, the insulating layer 4 has a relatively thick end portion in the layer 4 in a section view. The relatively thick end portion is a portion where the thickness is increased toward an end face. Specifically, the insulating layer 4 has an end portion relatively thicker than the thickness of a central portion in a section view at least at one end, preferably at both ends. The end portion of the insulating layer 4 having such an end portion thick structure in a section view can increase the physical strength of the end portion of the insulating layer 4 and prevent a generation of a crack from the end portion of the insulating layer more sufficiently. In the present embodiment, it is sufficient that one end portion of the insulating layer 4 has such an end portion thick structure in a section view, but from the viewpoint of further preventing a crack, it is preferable that both end portions of the insulating layer 4 have the end portion thick structure. From the viewpoint of further preventing a crack, it is more preferable that both end portions of all the insulating layers between all two adjacent battery elements in the stacking direction have such an end portion thick structure.

Figure 1B:
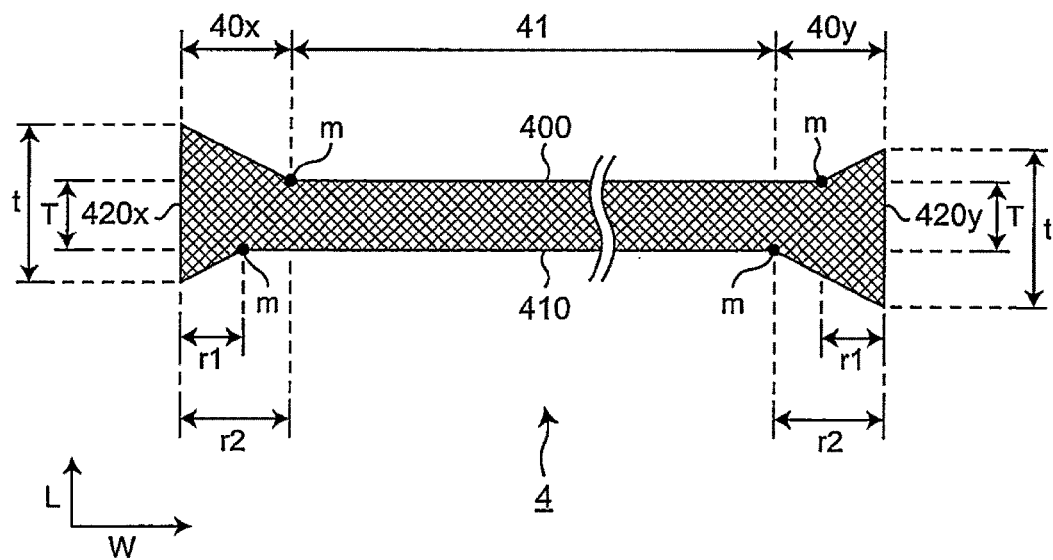
FIG. 1B is a schematic enlarged sectional view of an insulating layer disposed between battery elements in the solid-state battery of FIG. 1A.

As illustrated in FIG. 1B, the thickness in the insulating layer 4 is a distance between an upper face 400 and a lower face 410 constituting the insulating layer and is a distance along the stacking direction L. FIG. 1B is a schematic enlarged sectional view of the insulating layer 4 disposed between battery elements in the solid-state battery of FIG. 1A.

As illustrated in FIG. 1B, the insulating layer 4 includes end portions 40x, 40y having a relatively large thickness (hereinafter, they may be referred to as thick end portions) and a central portion 41 having a relatively small and substantially uniform thickness. In the thick end portion 40x of FIG. 1B, the thickness is gradually increased toward an end face 420x, but the thickness may be increased stepwise. In the end portion 40x of FIG. 1B, the thickness is increased toward the end face 420x by a linear raise on both faces of the upper face 400 and the lower face 410, but the thickness may be increased by a linear raise on one face or by a curved raise on both faces or one face. The thickness may be increased toward the end face 420x by a combination of a linear raise on one of the upper face 400 or the lower face 410 and a curved raise on the other one (not illustrated). The end portion 40x of FIG. 1B is a solid in a section view, but it may have a thickness increased toward the end face 420x by having a cavity portion (see 421 in an end portion thick structure of (B) and (E) in FIG. 1C described later) in part. The cavity portion is a recess formed from the end face 420x toward the inside thereof, and the cavity portion has an opening in the end face 420x at the thick end portion. The opening area parallel to the end face 420x at the cavity portion gradually decreases toward the inside. The cavity portion may be filled with a material (for example, the material of the end face electrode) different from the constituent material of the insulating layer 4.

The increase in the thickness of the thick end portion 40y with respect to the end face 420y in FIG. 1B may be the same as the increase in the thickness of the thick end portion 40x with respect to the end face 420x described above. The thickness of the thick end portion 40y in FIG. 1B may also be increased toward the end face 420y by having a cavity portion in part in the same manner as in the thick end portion 40x. The cavity portion may be filled with a material (for example, the material of the end face electrode) different from the constituent material of the insulating layer 4.

Figure 1C:
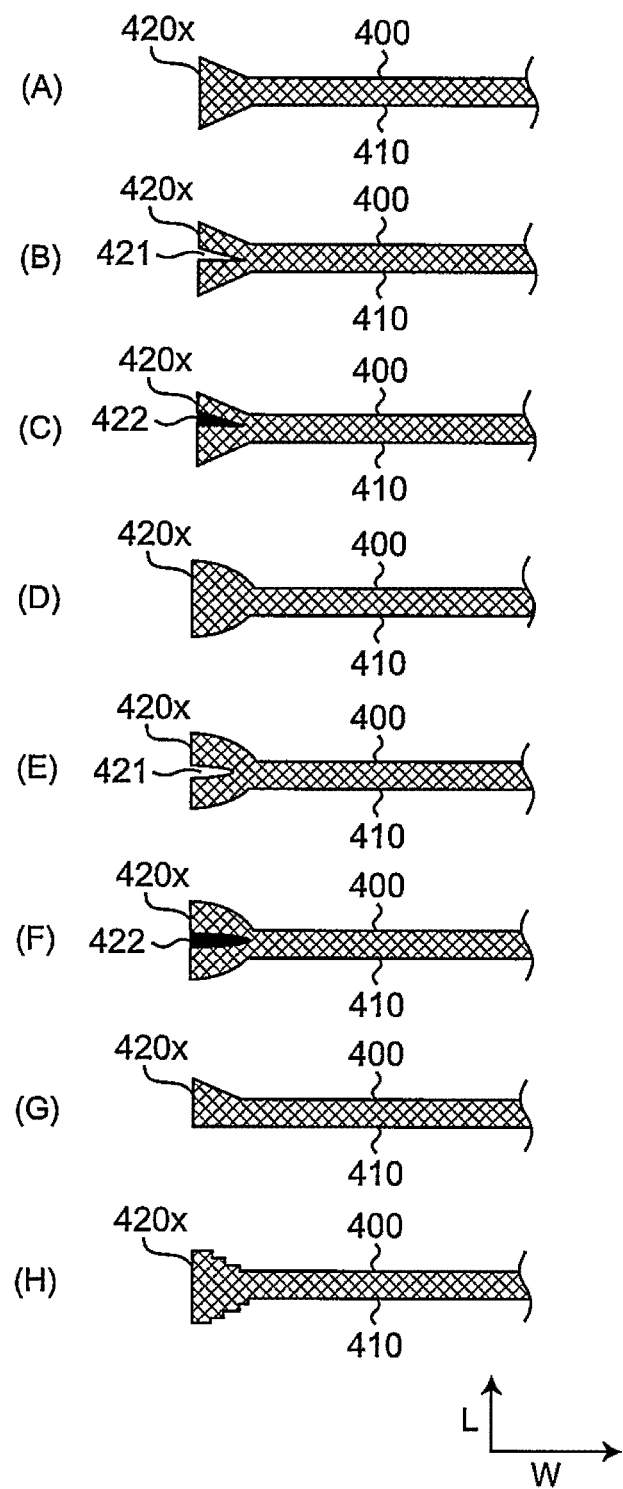
FIG. 1C is a schematic sectional view illustrating a specific example of an end portion thick structure that can be included in an end portion of an insulating layer disposed between battery elements in a solid-state battery of the present invention.

Specific examples of the end portion thick structure that can be included in the thick end portion 40x of the insulating layer 4 are illustrated in FIGS. 1C(A) to 1C(H). FIGS. 1C(A) to 1C(H) are schematic sectional views illustrating specific examples of the end portion thick structures that can be included in an end portion of the insulating layer disposed between battery elements in the solid-state battery of the present invention.

FIG. 1C(A) shows an end portion thick structure in which the thickness is gradually increased by linearly raising both the upper face 400 and the lower face 410 toward the end face 420x.

FIG. 1C(B) shows an end portion thick structure in which the thickness is gradually increased by linearly raising both the upper face 400 and the lower face 410 toward the end face 420x and forming the cavity portion 421 from the end face 420x toward the inside of the end portion 40x. The end portion 40x having the cavity portion 421 with an opening in the end face 420x as described above can prevent propagation of a crack if a crack occurs at the end portion.

FIG. 1C(C) shows an end portion thick structure in which the thickness is gradually increased by linearly raising both the upper face 400 and the lower face 410 toward the end face 420x and forming and filling a cavity portion with a material (for example, the material of the end face electrode) 422 different from the constituent material of the insulating layer 4. With the material of the end face electrode as the material 422 different from the constituent material of the insulating layer 4, the material of the end face electrode being filled in such an end portion thick structure, the filling portion functions as an anchor of the end face electrode, and therefore the joint strength of the end face electrode improves.

FIG. 1C(D) shows an end portion thick structure in which the thickness is gradually increased by raising both the upper face 400 and the lower face 410 in a curved manner toward the end face 420x.

FIG. 1C(E) shows an end portion thick structure in which the thickness is gradually increased by raising both the upper face 400 and the lower face 410 in a curved manner toward the end face 420x and forming the cavity portion 421 from the end face 420x toward the inside of the end portion 40. The end portion 40x having the cavity portion 421 with an opening in the end face 420x as described above can prevent propagation of a crack in the same manner as in the end portion thick structure of FIG. 1C(B).

FIG. 1C(F) shows an end portion thick structure in which the thickness is gradually increased by raising both the upper face 400 and the lower face 410 in a curved manner toward the end face 420x and forming and filling a cavity portion with the material (for example, the material of the end face electrode) 422 different from the constituent material of the insulating layer 4. With the material of the end face electrode as the material 422 different from the constituent material of the insulating layer 4, the material of the end face electrode being filled in such an end portion thick structure, the joint strength of the end face electrode improves in the same manner as in the end portion thick structure of FIG. 1C(C).

FIG. 1C(G) shows an end portion thick structure in which the thickness is gradually increased by raising only one of the upper face 400 or the lower face 410 (especially the upper face 400) in a curved manner toward the end face 420x.

FIG. 1C(H) shows an end portion thick structure in which the thickness is increased stepwise by raising both the upper face 400 and the lower face 410 stepwise toward the end face 420x.

It is preferable that the thickness of the end portion 40x (and/or 40y) be gradually increased by a linear or curved raise (especially linear raise) on both faces of the upper face 400 and the lower face 410 toward the end face 420x (and/or 420y) as in the structures FIG. 1C(A) to FIG. 1C(F) described above from a viewpoint of more sufficiently obtaining an effect of increasing physical strength because of an increase in thickness.

The end portion 40x (and/or 40y) preferably has a cavity portion 421 as in the structures of FIG. 1C(B) and FIG. 1C(E) described above from the viewpoint of more sufficiently obtaining an effect of increasing physical strength due to the increase in thickness and an effect of preventing propagation of a crack.

In the end portion 40x (and/or 40y), it is preferable that a cavity portion be formed and the cavity portion be filled with the constituent material 422 of the end face electrode as in the structures FIG. 1C(C) and FIG. 1C(F) described above from the viewpoint of more sufficiently obtaining an effect of increasing physical strength because of the increase in thickness, an effect of preventing propagation of a crack, and the anchor effect of the end face electrode. In such a case, the end portion 40x (and/or 40y) has a filling portion 422 of the constituent material of the end face electrode from the end face 420x (and/or 420y) toward the inside thereof.

The insulating layer 4 having the thick end portion as described above may be the following insulating layer A or the following insulating layer B.

The insulating layer A is an insulating layer with the electrode layer immediately over the insulating layer A having a polarity different from the polarity of the electrode layer immediately under the insulating layer A like the insulating layer 4 illustrated in FIG. 1A. Such an insulating layer may be referred to as an insulating layer 4a.

The insulating layer B is an insulating layer with the electrode layer immediately over the insulating layer B having the same polarity as the polarity of the electrode layer immediately under the insulating layer B like the insulating layer 4b illustrated in FIG. 4 described later. Such an insulating layer may be referred to as an insulating layer 4b.

From the viewpoint of further preventing a crack, the insulating layer 4 having the thick end portion as described above is preferably the insulating layer A. That is, the insulating layer A preferably has the thick end portion as described above at one end or both ends (especially both ends). This is because while the insulating layer A is more likely to have a crack at the end portion than the insulating layer B, the crack can be more sufficiently prevented in such an insulating layer A as well in the present embodiment.

For the insulating layers A and B, the electrode layer immediately over the insulating layer means the electrode layer closest to the insulating layer over the insulating layer. The insulating layer is usually in direct contact with the electrode layer immediately over the insulating layer (especially the current collecting layer). In FIG. 1A, the electrode layer immediately over the insulating layer 4 as the insulating layer A is the negative electrode layer 2 (especially the negative electrode current collecting layer 21), and the insulating layer 4 is in direct contact with the negative electrode layer 2 (especially the negative electrode current collecting layer 21).

The electrode layer immediately under the insulating layer means an electrode layer closest to the insulating layer under the insulating layer. The insulating layer is usually in direct contact with the electrode layer immediately under the insulating layer (especially the current collecting layer). In FIG. 1A, the electrode layer immediately under the insulating layer 4 as the insulating layer A is the positive electrode layer 1 (especially the positive electrode current collecting layer 11), and the insulating layer 4 is in direct contact with the positive electrode layer 1 (especially the positive electrode current collecting layer 11).

From the viewpoint of further preventing a crack, the thick end portion preferably has a width length r of 1% to 10%, particularly 1% to 5% with respect to a total width R of the insulating layer having the thick end portion in a section view. The width length r of the thick end portion is a length from an end face. For example, when both the upper face and the lower face of the thick end portion are raised as in the thick end portion 40x (or 40y) illustrated in FIGS. 1A and 1B, the width length r is an average value of distances r1 and r2 of a raised point m in each surface from the end face 420x (or 420y). The raised point m is a point at which the raise starts from the central portion 41 toward an end face on each of the upper face 400 and the lower face 410 in a section view.

The dimension of the insulating layer having the thick end portion may be appropriately set according to the overall dimension of the solid-state battery. For example, the total width R of the insulating layer having the thick end portion is not particularly limited and may be a dimension corresponding to the width dimension in the overall dimension of the solid-state battery. From the viewpoint of further preventing a crack, the total width R is, for example, 0.5 mm to 10 mm, particularly 1 mm to 10 mm, preferably 1 mm to 5 mm, and particularly preferably 2 mm to 3 mm.

From the viewpoint of further preventing a crack, the thick end portion preferably has a maximum thickness t of 120% to 300%, particularly 150% to 200% with respect to a thickness T of the central portion 41 in a section view. The maximum thickness t of the thick end portion is, for example, a thickness at the end face 420x (or 420y) of the insulating layer as illustrated in FIGS. 1A and 1B.

The thickness T of the central portion 41 is not particularly limited, and is, for example, preferably 10 μm to 100 μm, particularly preferably 20 μm to 50 μm, from the viewpoint of further preventing a crack. As the thickness of the central portion 41, an average value of thicknesses at any 50 positions is used.

The maximum thickness t of the thick end portion is not particularly limited, and is, for example, preferably 20 μm to 200 μm, and particularly preferably 30 μm to 80 μm, from the viewpoint of further preventing a crack.

In the present embodiment, as described above, the insulating layer 4 has a thick end portion at one (preferably both) end portion in a section view (hereinafter, sometimes referred to as a section view A) perpendicular to the two end face electrodes 9x, 9y and the insulating layer 4. In the present embodiment, the insulating layer 4 may have the thick end portion as described above at one (preferably both) end portion in a section view (hereinafter, sometimes referred to as a section view B) parallel to the two end face electrodes 9x, 9y and perpendicular to (for example, orthogonal to) the insulating layer 4, and it does not have to have a thick end portion at either of the end portions. In a preferred embodiment, the insulating layer 4 has the thick end portion at one (preferably both) end portion not only in the section view A but also in the section view B. This is because the prevention of a crack is further achieved. At this time, the thick end portion in the section view B has the cavity portion 421 as described above, and the cavity portion 421 is filled with the constituent material 422 of a protective layer described later, which improves the joint strength with the protective layer. That is, in the solid-state battery of FIG. 1A (section view A), the end face electrodes 9x and 9y are formed on the left side face and the right side face, respectively, and therefore, when the protective layer is formed, the protective layer is formed on the surfaces of the end face electrodes 9x, 9y on these side faces. In such a solid-state battery, no end face electrode is formed on the front side face or the back side face (none of them are illustrated) on the paper surface of FIG. 1A (section view A), and therefore, the protective layer is directly formed on these side faces. Therefore, the thick end portion in the section view B has the cavity portion 421 as described above, and the cavity portion 421 is filled with the constituent material 422 of the protective layer to be described later, which improves the joint strength with the protective layer.

The overall dimensions of the solid-state battery are not particularly limited. For example, the thickness dimension (thickness in the stacking direction L) of the solid-state battery may be 100 μm to 3 mm. The width dimension (length dimension in the width direction W) and the depth dimension (length dimension in the front and back direction of the paper surface in FIG. 1A) of the solid-state battery may each independently be 0.5 mm to 10 mm.

It is preferable that all the layers constituting the battery element 100 (100A, 100B) be sintered bodies and integrally sintered between two adjacent layers from the viewpoint of suppressing deterioration of the battery for a longer period of time. The fact that all the layers are sintered bodies and integrally sintered between two adjacent layers means that the two adjacent layers are joined by sintering. Specifically, both the two adjacent layers are sintered bodies and integrally sintered. Note that not the whole of the two adjacent layers need to be strictly integrated, and a part thereof does not have to be integrated. It is sufficient that two adjacent layers are integrated as a whole.

For example, as illustrated in FIG. 1A and FIGS. 2 to 6 described later, when the battery element 100 has one or more battery constituent units 10, and the positive electrode layer 1 and the negative electrode layer 2 respectively have the positive electrode current collecting layer 11 and the negative electrode current collecting layer 21, it is preferable to adopt a configuration in which the positive electrode current collecting layer 11, the positive electrode layer 1, the solid electrolyte layer 3, the negative electrode layer 2, and the negative electrode current collecting layer 21 are integrally sintered in a predetermined stacking order.

For example, when the battery element 100 has one or more battery constituent units 10, and the positive electrode layer 1 and the negative electrode layer 2 do not have the positive electrode current collecting layer 11 or the negative electrode current collecting layer 21, it is preferable to adopt a configuration in which the positive electrode layer 1, the solid electrolyte layer 3, and the negative electrode layer 2 are integrally sintered in a predetermined stacking order.

As illustrated in FIG. 1A and FIGS. 2 to 6 described later, the positive electrode layer 1 and the negative electrode layer 2 may have the positive electrode current collecting layer 11 and the negative electrode current collecting layer 21, respectively, or they do not have to have the positive electrode current collecting layer 11 or the negative electrode current collecting layer 21.

When the positive electrode layer 1 and the negative electrode layer 2 have the positive electrode current collecting layer 11 and the negative electrode current collecting layer 21, respectively, the positive electrode current collecting layer 11 and the negative electrode current collecting layer 21 are electrically connected to the end face electrodes 9x, 9y, respectively, as illustrated in FIG. 1A and FIGS. 2 to 6 described later.

When the positive electrode layer 1 and the negative electrode layer 2 do not have the positive electrode current collecting layer 11 or the negative electrode current collecting layer 21, the positive electrode layer 1 and the negative electrode layer 2 are electrically connected to the end face electrodes 9x, 9y, respectively.

The solid-state battery of the present embodiment may have any shape in plan view, and usually has a quadrilateral shape. The quadrilateral shape encompasses squares and rectangles.

Positive Electrode Layer and Negative Electrode Layer

The positive electrode layer 1 is a so-called positive electrode active material layer and may additionally include the positive electrode current collecting layer 11. When the positive electrode layer 1 has the positive electrode current collecting layer 11, the positive electrode layer 1 may be provided on one side or on both sides of the positive electrode current collecting layer 11. The positive electrode layer 1 is formed of a sintered body containing positive electrode active material grains and may be usually formed of a sintered body containing positive electrode active material grains, electron conductive material grains, and solid electrolyte grains contained in the solid electrolyte layer 3.

The negative electrode layer 2 is a so-called negative electrode active material layer and may additionally include the negative electrode current collecting layer 21. When the negative electrode layer 2 has the negative electrode current collecting layer 21, the negative electrode layer 2 may be provided on one side or on both sides of the negative electrode current collecting layer 21. The negative electrode layer 2 is formed of a sintered body containing negative electrode active material grains and may be formed of a sintered body containing negative electrode active material grains, electron conductive material grains, and solid electrolyte grains contained in the solid electrolyte layer 3.

The positive electrode active material contained in the positive electrode layer and the negative electrode active material contained in the negative electrode layer are substances involved in the transfer of electrons in the solid-state battery, and ions contained in the solid electrolyte material constituting the solid electrolyte layer move (conduct) between the positive electrode and the negative electrode to transfer electrons, whereby charging and discharging are performed. The positive electrode layer and the negative electrode layer are preferably layers capable of occluding and releasing, specifically, lithium ions or sodium ions. That is, the solid-state battery of the present embodiment is preferably a solid-state secondary battery in which lithium ions or sodium ions move between the positive electrode and the negative electrode through the solid electrolyte layer, whereby charge and discharge of the battery are performed.

The positive electrode active material contained in the positive electrode layer is not particularly limited, and examples thereof include at least one selected from the group consisting of a lithium-containing phosphoric acid compound having a NASICON-type structure, a lithium-containing phosphoric acid compound having an olivine-type structure, a lithium-containing layered oxide, a lithium-containing oxide having a spinel-type structure, and the like. Examples of the lithium-containing phosphoric acid compound having a NASICON-type structure include $Li_3V_2(PO_4)_3$. Examples of the lithium-containing phosphoric acid compound having an olivine type structure include $LiFePO_4$ and $LiMnPO_4$. Examples of the lithium-containing layered oxide include $LiCoO_2$ and $LiCo_{1/3}Ni_{1/3}Mn_{1/3}O_2$. Examples of the lithium-containing oxide having a spinel-type structure include $LiMn_2O_4$ and $LiNi_{0.5}Mn_{1.5}O_4$.

Examples of the positive electrode active material capable of occluding and releasing sodium ions include at least one selected from the group consisting of a sodium-containing phosphoric acid compound having a NASICON-type structure, a sodium-containing phosphoric acid compound having an olivine-type structure, a sodium-containing layered oxide, a sodium-containing oxide having a spinel-type structure, and the like.

The negative electrode active material contained in the negative electrode layer is not particularly limited, and examples thereof include at least one selected from the group consisting of an oxide containing at least one element selected from the group consisting of Ti, Si, Sn, Cr, Fe, Nb, and Mo, a graphite-lithium compound, a lithium alloy, a lithium-containing phosphoric acid compound having a NASICON-type structure, a lithium-containing phosphoric acid compound having an olivine-type structure, and a lithium-containing oxide having a spinel-type structure. Examples of the lithium alloy include Li—Al. Examples of the lithium-containing phosphoric acid compound having a NASICON-type structure include $Li_3V_2(PO_4)_3$. Examples of the lithium-containing phosphoric acid compound having an olivine type structure include $Li_3Fe_2(PO_4)_3$. Examples of the lithium-containing oxide having a spinel-type structure include $Li_4Ti_5O_{12}$.

Examples of the negative electrode active material capable of occluding and releasing sodium ions include at least one selected from the group consisting of a sodium-containing phosphoric acid compound having a NASICON-type structure, a sodium-containing phosphoric acid compound having an olivine-type structure, a sodium-containing oxide having a spinel-type structure, and the like.

The electron conductive material contained in the positive electrode layer and the negative electrode layer is not particularly limited, and examples thereof include a metal material such as silver, palladium, gold, platinum, aluminum, copper, or nickel, and a carbon material. In particular, carbon is preferable because carbon hardly reacts with the positive electrode active material, the negative electrode active material, and the solid electrolyte material, and has an effect of reducing the internal resistance of the solid-state battery.

The solid electrolyte material contained in the positive electrode layer and the negative electrode layer may be selected from, for example, the same materials as the solid electrolyte material that can be contained in the solid electrolyte layer described later.

The positive electrode layer and the negative electrode layer may each independently contain a sintering agent. The sintering agent is not particularly limited, and may be, for example, at least one selected from the group consisting of lithium oxide, sodium oxide, potassium oxide, boron oxide, silicon oxide, bismuth oxide, and phosphorus oxide.

When the positive electrode layer 1 and the negative electrode layer 2 do not have the positive electrode current collecting layer 11 or the negative electrode current collecting layer 21 described later, the positive electrode layer 1 and the negative electrode layer 2 are electrically connected to the end face electrodes 9x, 9y, respectively.

The thicknesses of the positive electrode layer and the negative electrode layer are not particularly limited, and may be each independently, for example, 2 μm to 50 μm, particularly 5 μm to 30 μm.

Positive Electrode Current Collecting Layer and Negative Electrode Current Collecting Layer The positive electrode layer 1 and the negative electrode layer 2 may respectively have the positive electrode current collecting layer 11 and the negative electrode current collecting layer 21, independently of each other. When the positive electrode layer 1 and the negative electrode layer 2 respectively have the positive electrode current collecting layer 11 and the negative electrode current collecting layer 21, the positive electrode current collecting layer 11 and the negative electrode current collecting layer 21 are electrically connected to the end face electrodes 9x, 9y, respectively, as illustrated in FIG. 1A and FIGS. 2 to 6 described later.

Each of the positive electrode current collecting layer 11 and the negative electrode current collecting layer 21 may have a form of a foil, but preferably have a form of a sintered body from the viewpoint of reducing the manufacturing cost of the solid-state battery by integrally firing and reducing the internal resistance of the solid-state battery.

When the positive electrode current collecting layer 11 and the negative electrode current collecting layer 21 have the form of a sintered body, for example, they may be formed of a sintered body containing electron conductive material grains and a sintering agent. The electron conductive material contained in the positive electrode current collecting layer 11 and the negative electrode current collecting layer 21 may be selected from, for example, the same materials as the electron conductive material that can be contained in the positive electrode layer and the negative electrode layer. The sintering agent contained in the positive electrode current collecting layer 11 and the negative electrode current collecting layer 21 may be selected from, for example, the same material as the sintering agent that can be contained in the positive electrode layer and the negative electrode layer.

The thicknesses of the positive electrode current collecting layer and the negative electrode current collecting layer are not particularly limited, and may be each independently, for example, 1 μm to 5 μm, particularly 1 μm to 3 μm.

Solid Electrolyte Layer

The solid electrolyte layer 3 is formed of a sintered body containing solid electrolyte grains. The material of the solid electrolyte grains (that is, the solid electrolyte material) is not particularly limited as long as it can provide ions (for example, lithium ions or sodium ions) that can move (conduct) between the positive electrode layer and the negative electrode layer. Examples of the solid electrolyte material include a lithium-containing phosphoric acid compound having a NASICON-type structure, an oxide having a perovskite structure, and an oxide having a garnet-type structure or a structure similar to a garnet-type structure. Examples of the lithium-containing phosphoric acid compound having a NASICON-type structure include $Li_xM_y(PO_4)_3$ (1≤x≤2, 1≤y≤2, and M is at least one selected from the group consisting of Ti, Ge, Al, Ga, and Zr). Examples of the lithium-containing phosphoric acid compound having a NASICON-type structure include $Li_{1.2}Al_{0.2}Ti_{1.8}(PO_4)_3$. Examples of the oxide having a perovskite structure include $La_{0.55}Li_{0.35}TiO_3$. Examples of the oxide having a garnet-type structure or a structure similar to a garnet-type structure include $Li_7La_3Zr_2O_{12}$.

Examples of the solid electrolyte capable of conducting sodium ions include a sodium-containing phosphoric acid compound having a NASICON-type structure, an oxide having a perovskite structure, and an oxide having a garnet-type or garnet-type similar structure. Examples of the sodium-containing phosphoric acid compound having a NASICON-type structure include $Na_xM_y(PO_4)_3$ (1<x<2, 1<y<2, and M is at least one selected from the group consisting of Ti, Ge, Al, Ga, and Zr).

The solid electrolyte layer may contain a sintering agent. The sintering agent contained in the solid electrolyte layer may be selected from, for example, the same materials as the sintering agent that can be contained in the positive electrode layer and the negative electrode layer.

The thickness of the solid electrolyte layer is not particularly limited, and may be, for example, 1 μm to 15 μm, particularly 1 μm to 5 μm.

Insulating Layer

The insulating layer 4 is formed between two adjacent battery elements 100 in the solid-state battery, and is constructed to prevent expansion and contraction in the width direction W due to charging and discharging of the solid-state battery, and constructed to prevent unintended connection between the adjacent solid-state batteries. In the present embodiment, the insulating layer 4 is made of an insulating substance. The insulating substance means a substance having no ion conductivity or electron conductivity. Therefore, the insulating substance is an insulating inorganic substance having no ion conductivity or electron conductivity. The inorganic substance having no ion conductivity means an inorganic substance having an ion conductivity of $1 \times 10^{-7}$ S/cm or less. From the viewpoint of suppressing deterioration of the battery for a longer period of time, the ion conductivity is preferably $1 \times 10^{-10}$ S/cm or less. The inorganic substance having no electron conductivity means an inorganic substance having electron conductivity of $1 \times 10^{-7}$ S/cm or less. From the viewpoint of suppressing deterioration of the battery for a longer period of time, the electron conductivity is preferably $1 \times 10^{-10}$ S/cm or less.

Since the insulating layer 4 is formed of such an insulating substance, the insulating layer 4 has further excellent moisture resistance, environmental resistance, and durability. Specifically, the insulating layer 4 can be an insulating layer having higher joint strength with the battery element than an insulating layer containing a resin (for example, a polymer compound). As a result, in the solid-state battery of the present embodiment, the insulating layer 4 can more sufficiently prevent expansion and contraction of the solid-state battery in the width direction W than the insulating layer containing a polymer compound, and as a result, can more sufficiently suppress deterioration of battery performance.

Examples of the insulating substance constituting the insulating layer 4 include glass and ceramics. Examples of the glass include quartz glass ($SiO_2$), and composite oxide-based glass obtained by combining $SiO_2$ and at least one selected from PbO, $B_2O_3$, MgO, ZnO, $Bi_2O_3$, $Na_2O$, and $Al_2O_3$. Examples of the ceramics include alumina, cordierite, mullite, steatite, forsterite, and various spinel compounds. The insulating layer 4 may be formed of one or more materials selected from the group consisting of these substances. The insulating layer 4 may contain a material having electron conductivity (for example, metal) as long as it does not cause a short circuit of the battery element 100. When the insulating layer 4 contains a material having electron conductivity, the content ratio of the electron conductive material may be, for example, 1 vol % or less. Since the insulating layer 4 contains an electron conductive material (for example, metal), heat generated by a battery reaction can be smoothly released to the outside.

The insulating layer 4 is formed of a sintered body containing the insulating substance grains described above. In the present embodiment, the sintered body constituting the insulating layer 4 has pores between the insulating substance grains, but has denseness to the extent that adsorption, absorption, and permeation of moisture and gas (carbon dioxide) can be suppressed in the thickness direction (for example, the stacking direction L).

The insulating layer 4 may contain a resin such as a polymer compound, and for example, a polymer compound used at the time of manufacturing and/or a thermal decomposition product thereof may remain. The content of residues such as a polymer compound and a thermal decomposition product thereof in the insulating layer 4 is usually 0.1 wt % or less, and particularly 0.01 wt % or less with respect to the total amount of the insulating layer. In the positive electrode layer, the positive electrode current collecting layer, the negative electrode layer, the negative electrode current collecting layer, the solid electrolyte layer, and a side face reinforcing part which is described later, a residue may remain as in the insulating layer. For example, the content of the residue in each layer or each part of the positive electrode layer, the positive electrode current collecting layer, the negative electrode layer, the negative electrode current collecting layer, the solid electrolyte layer, and the side face reinforcing part may be within the same range as the content range of the residue in the insulating layer 4 as a value with respect to the total amount of each layer.

The porosity of the insulating layer 4 may be, for example, 0.1 vol % to 20 vol %, particularly 1 vol % to 10 vol %. As the porosity, a value measured by a gravimetric porosity method, a computed tomography method using CT scanning, an immersion method, or the like is used.

The oxygen permeability of the insulating layer 4 in the thickness direction may be, for example, $10^{-1}$ cc/m²/day/atmospheric pressure or less, particularly $10^{-3}$ cc/m²/day/atmospheric pressure or less.

The $H_2O$ permeability of the insulating layer 4 in the thickness direction may be, for example, $10^{-2}$ g/m²/day or less, particularly $10^{-4}$ g/m²/day or less. As the $H_2O$ permeability, a value measured at 25° C. by a carrier gas method, a pressure deposition method, or a Ca corrosion method is used.

As described above, the insulating layer 4 includes the thick end portions 40x, 40y and the central portion 41, and their dimensions may be within the above ranges.

The insulating layer 4 is interposed between the battery elements 100. Usually, on each of the upper and lower faces of the insulating layer 4, the insulating layer 4 may be in direct contact with upper and lower battery elements (for example, an electrode layer such as a positive electrode layer or a negative electrode layer, or an electrode current collecting layer such as a positive electrode current collecting layer or a negative electrode current collecting layer), or may be in indirect contact with battery elements with a layer other than the layers constituting the battery elements interposed therebetween. The fact that the insulating layer 4 is in direct contact with the battery element means that the surface of the insulating layer 4 and the surface of the battery element are in direct contact with each other without a layer other than the layers constituting the battery element between the insulating layer 4 and the battery element. In the present embodiment, the insulating layer 4 is preferably in direct contact with the surface of the battery element 100 for the following reasons (1) and (2):

Reason (1): When strong vibration and/or impact is applied to the solid-state battery, the coupling between the battery elements can be sufficiently maintained, and the deterioration of battery performance due to the separation of the battery elements is further less likely to occur; and Reason (2): Since the volume of the solid-state battery is reduced due to the absence of other layers that do not exhibit a battery function, the energy density of the battery improves.

The insulating layer 4 and the battery element 100 disposed over the insulating layer 4 are in contact with each other at the upper face of the insulating layer 4 and the lower face of the lowermost layer constituting the battery element 100. The lowermost layer may be an electrode layer such as a positive electrode layer or a negative electrode layer, or an electrode current collecting layer such as a positive electrode current collecting layer or a negative electrode current collecting layer.

The insulating layer 4 and the battery element 100 disposed under the insulating layer 4 are in contact with each other at the lower face of the insulating layer 4 and the upper face of the uppermost layer constituting the battery element 100. The uppermost layer may be an electrode layer such as a positive electrode layer or a negative electrode layer, or an electrode current collecting layer such as a positive electrode current collecting layer or a negative electrode current collecting layer.

The insulating layer 4 is interposed between the battery elements 100. Usually, it is preferable that insulating layer 4 and the upper and lower battery elements (for example, an electrode layer such as a positive electrode layer or a negative electrode layer, or an electrode current collecting layer such as a positive electrode current collecting layer or a negative electrode current collecting layer) be sintered bodies and integrally sintered on each of the upper and lower faces of the insulating layer 4. The fact that the insulating layer 4 and the battery element 100 are sintered bodies and integrally sintered means that the insulating layer 4 is joined to the battery element 100 by sintering. Specifically, both the insulating layer 4 and the battery element 100 are sintered bodies and integrally sintered. For example, it is preferable to adopt a configuration in which the insulating layer 4 and the battery element 100 are integrally sintered. Note that not the whole of the insulating layer 4 and the battery element 100 need to be strictly integrated, and a part thereof does not have to be integrated. It is sufficient that the insulating layer 4 and the battery element 100 are integrated as a whole.

Protective Layer

As illustrated in FIG. 1A, a protective layer 5 (5a, 5b) is formed on the upper and lower faces of the solid-state battery and is preferably also formed on all side faces of the solid-state battery. The protective layer 5 is for electrically, physically, and chemically protecting the solid-state battery (especially the battery element). In the present embodiment, the protective layer 5 may be usually made of an insulating substance independently selected from the same range as the insulating substance constituting the insulating layer 4.

The protective layer 5 is formed of a sintered body containing the insulating substance grains described above. In the present embodiment, the sintered body constituting the protective layer 5 has pores between the insulating substance grains, but has denseness to the extent that adsorption, absorption, and permeation of moisture and gas (carbon dioxide) can be suppressed in the thickness direction (for example, the stacking direction L).

The protective layer 5 does not have to be devoid of a resin such as a polymer compound, and the polymer compound used at the time of manufacturing and/or a thermal decomposition product thereof may remain as in the insulating layer 4. The content of residues such as a polymer compound and a thermal decomposition product thereof in the protective layer 5 may be usually within the same range as the content allowed in the insulating layer 4.

The porosity of the protective layer 5 may be in the same range as the porosity of the insulating layer 4.

The oxygen permeability of the protective layer 5 in the thickness direction may be in the same range as the oxygen permeability of the insulating layer 4 in the thickness direction.

The $H_2O$ permeability of the protective layer 5 in the thickness direction may be in the same range as the $H_2O$ permeability of the insulating layer 4 in the thickness direction.

The thickness of a thickest portion of the protective layer 5 is preferably 500 µm or less, more preferably 100 µm or less, still more preferably 50 µm or less, and most preferably 20 µm or less from the viewpoint of further suppressing deterioration of battery performance. The protective layer 5 has an average thickness of preferably 1 µm or more, more preferably 5 µm or more, from the viewpoint of further suppressing deterioration of battery performance due to adsorption, absorption, permeation, and the like of moisture and gas (carbon dioxide).

As the thickness of the thickest portion and the average thickness of the protective layer 5, the maximum thickness and the average thickness for the thickness at any 100 positions are used, respectively.

The protective layer 5 covers the upper and lower faces of the solid-state battery. The protective layer 5 may be in direct contact with the upper and lower faces of the battery element covered with the protective layer 5 as illustrated in FIGS. 1A and 2 to 6 or may be in indirect contact with the battery element with a layer other than the layer constituting the battery element interposed therebetween. The fact that the protective layer 5 is in direct contact with the upper and lower faces of the battery element means that the surface of the protective layer and the surface of the battery element are in direct contact with each other without a layer other than the layers constituting the battery element between the protective layer 5 and the battery element. In the present embodiment, the protective layer 5 is preferably in direct contact with the surface of the battery element 100 covered with the protective layer 5 for the following reasons (3) and (4):

Reason (3): The protective layer 5 is less likely to fall off when strong vibration and/or impact is applied to the solid battery, and deterioration in battery performance due to falling off of the protective layer is further less likely to occur; and Reason (4): Since the volume of the solid-state battery is reduced due to the absence of other layers that do not exhibit a battery function, the energy density of the battery improves.

It is preferable that the protective layer 5 and the upper and lower faces of the battery element 100 covered with the protective layer 5 be sintered bodies and integrally sintered. The fact that the protective layer 5 and the upper and lower faces of the battery element 100 covered with the protective layer 5 are sintered bodies and integrally sintered means that the protective layer 5 is joined to the upper and lower faces of the battery element 100 covered with the protective layer 5 by sintering. Specifically, both the protective layer 5 and the upper and lower faces of the battery element 100 covered with the protective layer 5 are sintered bodies and integrally sintered. For example, it is preferable to adopt a configuration in which the protective layer 5 and the battery element 100 are integrally sintered. Note that not the whole of the protective layer 5 and the upper and lower faces of the battery element 100 covered with the protective layer 5 need to be strictly integrated, and a part thereof does not have to be integrated. It is sufficient that the protective layer 5 and the upper and lower faces of the battery element 100 covered with the protective layer 5 are integrated as a whole.

The upper and lower faces of the battery element 100 covered with the protective layer 5 are usually surfaces of the outermost layer of the battery element 100. The outermost layer of the battery element 100 is the uppermost layer disposed at the uppermost position and the lowermost layer disposed at the lowermost position among the layers constituting the battery element 100. The surface of the outermost layer is the upper face of the uppermost layer and the lower face of the lowermost layer.

Side Face Reinforcing Part

From the viewpoint of further suppressing deterioration of battery performance due to adsorption, absorption, permeation, and the like of moisture and gas (carbon dioxide), the solid-state battery of the present embodiment preferably has a side face reinforcing part 6 (6x, 6y) on a side face of the battery element 100, that is, a side face of a stacked body including layers constituting the battery element 100, as illustrated in FIG. 1A and FIGS. 2 to 6 described later. The side face of the battery element 100 includes not only the right side face and the left side face of the battery element but also the front side face and the back side face with respect to the schematic sectional view of the solid-state battery (for example, FIG. 1A and FIGS. 2 to 6). That is, the side face reinforcing part 6x, 6y are usually continuously disposed around the battery element in plan view.

The side face reinforcing part 6 may be formed of a sintered body containing solid electrolyte grains, may be formed of a sintered body containing insulating substance grains, or may be formed of a sintered body containing mixed grains thereof. Since the side face reinforcing part 6 is formed of such a sintered body, the side face reinforcing part 6 has further excellent moisture resistance, environmental resistance, and durability. Specifically, the side face reinforcing part on 6 can be the side face reinforcing part 6 that is relatively difficult to adsorb, absorb, or transmit moisture and gas (carbon dioxide) and has high joint strength with the battery element. As a result, in the solid-state battery of the present embodiment, the side face reinforcing part 6 is relatively less likely to crack and fall off due to expansion caused by adsorption and absorption of moisture and gas (carbon dioxide) and is less likely to fall off due to vibration, impact, or the like. In addition, the side face reinforcing part 6 is relatively difficult to allow moisture and gas (carbon dioxide) to permeate therethrough. As a result, the solid-state battery of the present embodiment can further suppress deterioration of battery performance. From the viewpoint of further suppressing such a deterioration of battery performance of the solid-state battery, it is preferable that the side face reinforcing part 6 be formed of a sintered body containing insulating substance grains.

The insulating substance that can form the side face reinforcing part 6 may be independently selected from the same material as the insulating substance that can be contained in the insulating layer.

It is preferable that the side face reinforcing part 6 and the side face the battery element 100 be sintered bodies and integrally sintered. The fact that the side face reinforcing part 6 and the side face of the battery element 100 are sintered bodies and integrally sintered means that the side face reinforcing part 6 is joined to the side face of the battery element 100 by sintering. Specifically, both the side face reinforcing part 6 and the side face of the battery element 100 are sintered bodies and integrally sintered. For example, it is preferable to adopt a configuration in which the side face reinforcing part 6 and the battery element 100 are integrally sintered. Note that not the whole of the side face reinforcing part 6 and the side face of the battery element 100 covered with the side face reinforcing part 6 need to be strictly integrated, and a part thereof does not have to be integrated. It is sufficient that the side face reinforcing part 6 and the side face of the battery element 100 covered with the side face reinforcing part 6 are integrated as a whole.

The side face reinforcing part 6 preferably has a porosity within a range similar to the porosity of the insulating layer 4.

The side face reinforcing part 6 preferably has air permeability in the thickness direction within a range similar to the air permeability in the thickness direction of the insulating layer 4.

End Face Electrode

The solid-state battery of the present embodiment includes an end face electrode electrically connected to the positive electrode layer or the negative electrode layer on each of two opposite side faces of the stacked body including the insulating layer disposed between two battery elements adjacent to two or more battery elements 100 in the stacking direction L. In the solid-state battery of the present embodiment, the end face electrodes 9x, 9y are parallel to each other and also parallel to the stacking direction L. The end face electrodes 9x, 9y are electrically connected to the positive electrode layer 1 and the negative electrode layer 2, respectively. As the end face electrode, a material having high conductivity is preferably used. A specific material of the end face electrode is not particularly limited, and examples thereof include at least one conductive metal (that is, metal or alloy) selected from the group consisting of gold, silver, copper, platinum, tin, palladium, aluminum, titanium, nickel, oxygen-free copper, Cu—Sn alloy, Cu—Zr alloy, Cu—Fe alloy, Cu—Cr—Sn—Zn alloy, 42 alloy (Ni—Fe alloy), and Kovar alloy from the viewpoint of conductivity. Use of a metal material for the end face electrode material can suppress entry of moisture from the end face electrode. A part of the conductive metal may be oxidized.

The thicknesses of the end face electrodes 9x, 9y are not particularly limited, and may be, for example, 1 µm to 1 mm, and particularly 10 µm to 100 µm.

Second Embodiment

The solid-state battery of the present embodiment is the same as the solid-state battery of the first embodiment except that it has the following features.

Figure 2:
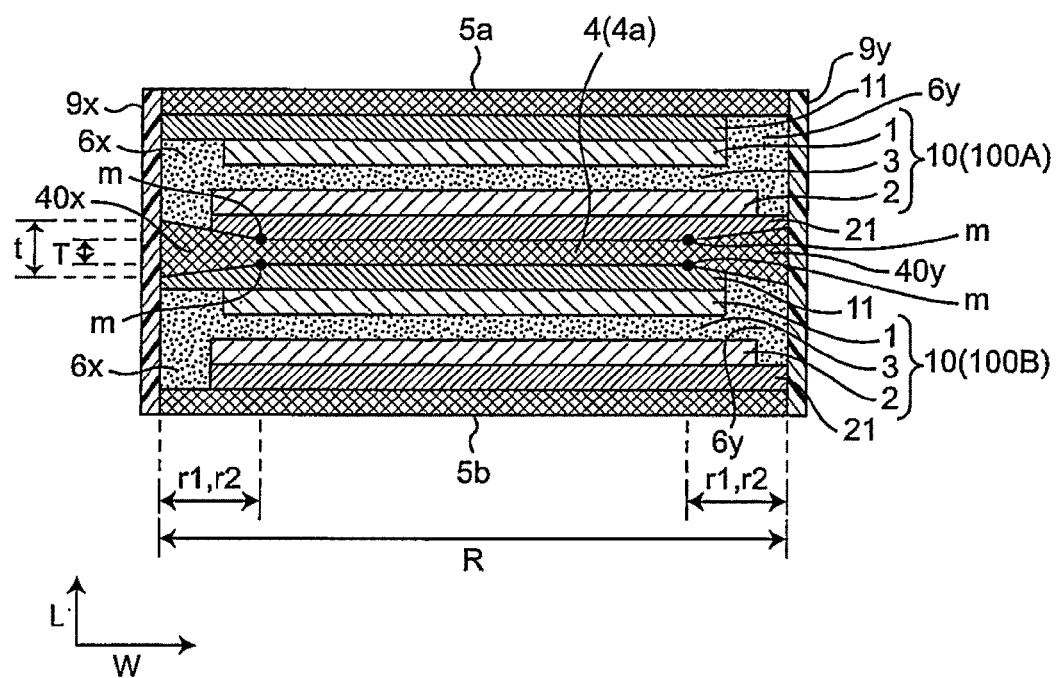
FIG. 2 is a schematic sectional view of a solid-state battery according to a second embodiment of the present invention.

As illustrated in FIG. 2, when the insulating layer having the thick end portion 40x (and/or 40y) is the above-described insulating layer A (4a), and at each thick end portion, the thickness of the thick end portion is increased toward the end face by raising the upper face and/or the lower face thereof toward the end face gradually or stepwise, the raised point m of the upper face and/or the raised point m of the lower face are respectively covered with the electrode layer immediately over the point and/or the electrode layer immediately under the point in a section view. FIG. 2 is a schematic sectional view of the solid-state battery according to the second embodiment of the present invention. As described above, the insulating layer A is the insulating layer 4a in which the electrode layer immediately over the insulating layer A has a polarity different from the polarity of the electrode layer immediately under the insulating layer A. When the positive electrode layer 1 and the negative electrode layer 2 respectively have the positive electrode current collecting layer 11 and the negative electrode current collecting layer 21 as described above, the positive electrode current collecting layer 11 and the negative electrode current collecting layer 21 form a part of the positive electrode layer 1 and the negative electrode layer 2, respectively, and are included in the positive electrode layer 1 and the negative electrode layer 2.

The present embodiment specifically includes the following aspects.

For example, when the insulating layer having the thick end portion 40x (and/or 40y) is the above-described insulating layer A (4a), and in each thick end portion, the thickness of the thick end portion is increased toward the end face by raising the upper face and the lower face thereof gradually or stepwise toward the end face as illustrated in FIG. 2, the raised points m on the upper face and the lower face are respectively covered with the electrode layer (in FIG. 2, the negative electrode layer 2, especially the negative electrode current collecting layer 21) immediately over the point and the electrode layer (in FIG. 2, the positive electrode layer 1, especially the positive electrode current collecting layer 11) immediately under the point in a section view.

For example, when the insulating layer having the thick end portion 40x (and/or 40y) is the above-described insulating layer A (4a), and the thickness of the thick end portion is increased toward the end face by raising only the upper face of the thick end portion gradually or stepwise toward the end face, the raised point of the upper face is covered with the electrode layer immediately over the point in a section view.

For example, when the insulating layer having the thick end portion 40x (and/or 40y) is the above-described insulating layer A (4a), and at each thick end portion, the thickness of the thick end portion is increased toward the end face by raising only the lower face thereof gradually or stepwise toward the end face, the raised point of the lower face is preferably covered with the electrode layer immediately under the point in a section view.

In the solid-state battery of the present embodiment, the following effects are obtained in addition to the effects obtained in the solid-state battery of the first embodiment.

Since the stress (or load) applied to the raised point m in charging and discharging is alleviated, cracks are more sufficiently prevented.

Third Embodiment

The solid-state battery of the present embodiment is the same as the solid-state battery of the first embodiment except that it has the following features.

Figure 3:
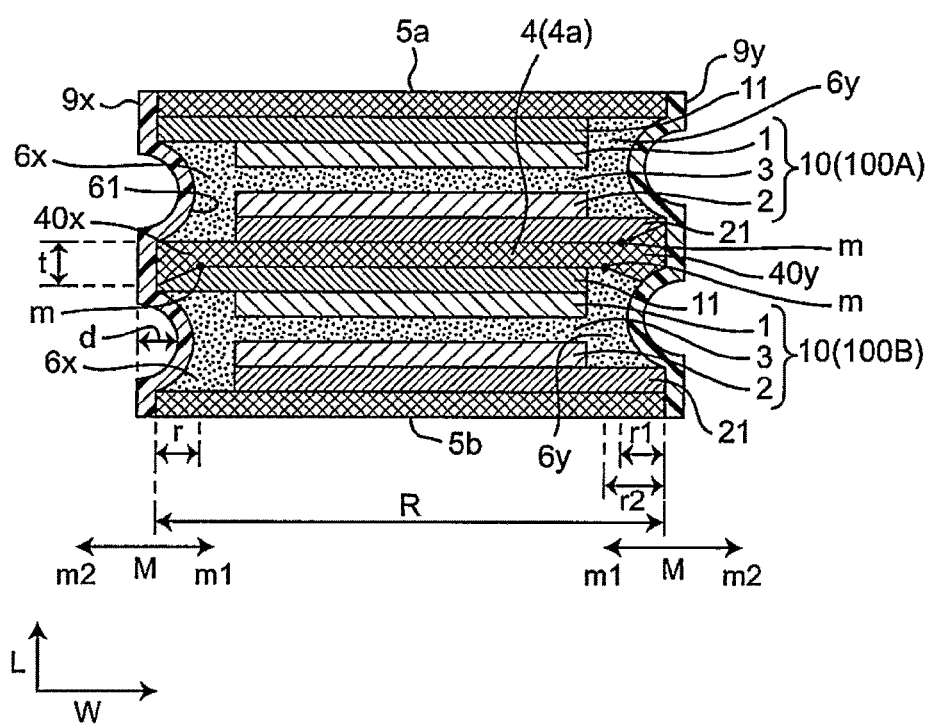
FIG. 3 is a schematic sectional view of a solid-state battery according to a third embodiment of the present invention.

As illustrated in FIG. 3, in a section view, the thickness of the thick end portion is increased toward the end face by raising only the lower face of the thick end portion 40x gradually or stepwise toward the end face. FIG. 3 is a schematic sectional view of the solid-state battery according to a third embodiment of the present invention.

An outer peripheral face 61 of the side face reinforcing part 6 (6x, 6y) is curved to an inward m1 in an in-plane direction M perpendicular to the stacking direction L in a section view. The curve is continuously bent or gradually recessed. The outer peripheral face 61 of the side face reinforcing part 6 being curved to the inward m1 in the in-plane direction M perpendicular to the stacking direction L in a section view means that, for each battery element 100 (100A or 100B), the outer peripheral face 61 of the side face reinforcing part 6 in the section view gradually approaches the side face of the battery element 100 from the lower side to the upper side in the stacking direction L and then gradually moves away from the side face as illustrated in FIG. 3. In other words, a depth d of the curve gradually decreases and then gradually increases from the lower side to the upper side in the stacking direction L.

The curve of the outer peripheral face 61 of the side face reinforcing part 6 may be formed over the entire periphery of the side face reinforcing part 6 in plan view.

The depth of the curve is not particularly limited as long as the shape of the solid-state battery can be maintained. A maximum depth d of the curve is usually 0.001×R to 0.08×R, particularly 0.01×R to 0.05×R or less with respect to the total width R of the insulating layer. The maximum depth d of the curve may be, for example, 50 µm or less, particularly 1 µm to 50 µm.

When the side face reinforcing part 6 (for example, 6y) has a curve, the maximum thickness t of the thick end portion 40y in the vicinity of the curve is the maximum thickness t when it is assumed that the side face reinforcing part 6 does not have a curve.

In the solid-state battery of the present embodiment, the following effects are obtained in addition to the effects obtained in the solid-state battery of the first embodiment.

The side face reinforcing part 6 (6x, 6y) having the curve on the outer peripheral face 61 can absorb the expansion by using the curve if the solid-state battery expands in the width direction W due to charging and discharging.

Fourth Embodiment

The solid-state battery of the present embodiment is the same as the solid-state battery of the first embodiment except that it has the following features.

Figure 4:
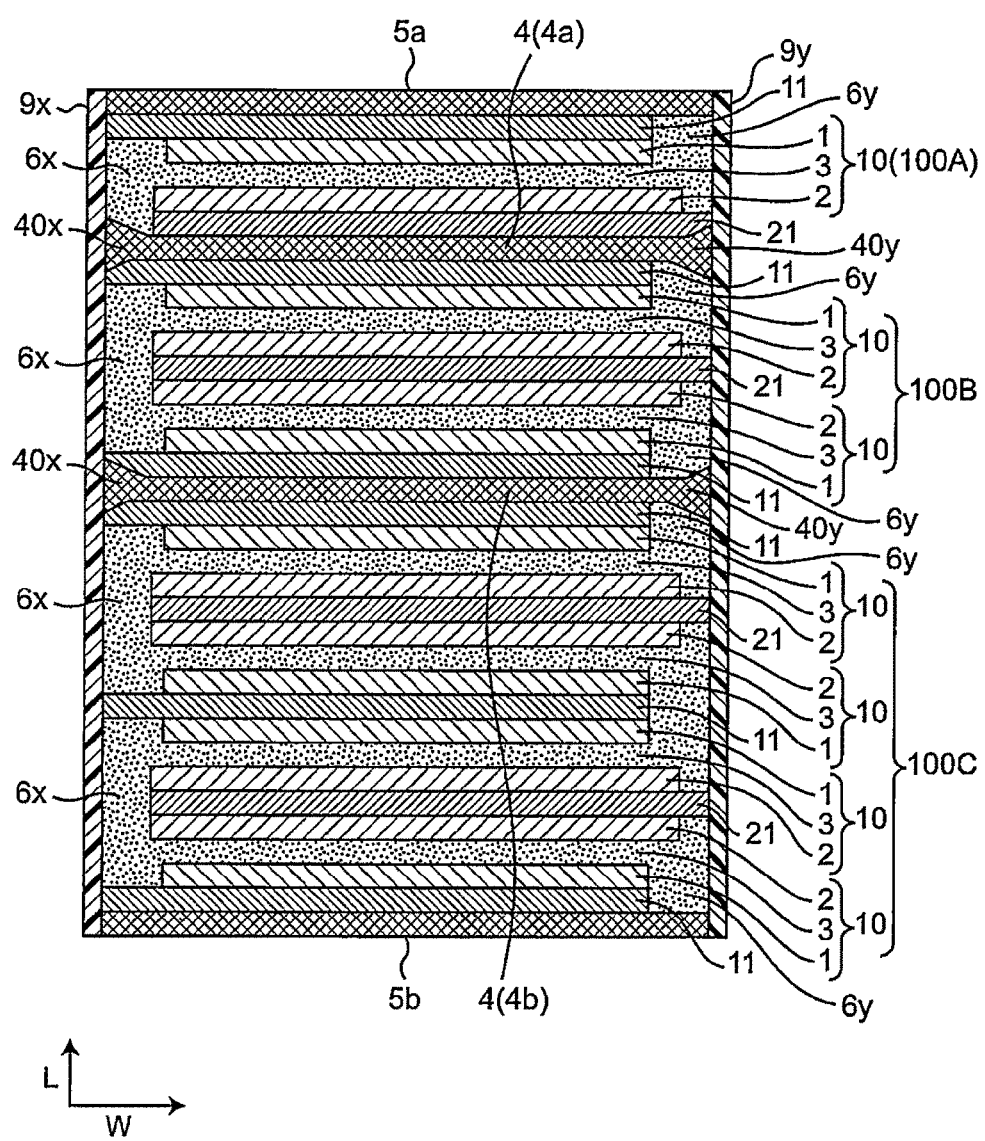
FIG. 4 is a schematic sectional view of a solid-state battery according to a fourth embodiment of the present invention.

As illustrated in FIG. 4, the solid-state battery includes the first battery element 100A, the second battery element 100B, and a third battery element 100C in order from the top. FIG. 4 is a schematic sectional view of the solid-state battery according to a fourth embodiment of the present invention.

The second battery element includes two battery constituent units 10.

The third battery element 100C includes four battery constituent units 10.

The insulating layer 4 interposed between the second battery element 100B and the third battery element 100C corresponds to the insulating layer B (4b). As described above, the insulating layer B is an insulating layer in which the electrode layer immediately over the insulating layer B has the same polarity as the polarity of the electrode layer immediately under the insulating layer B. In FIG. 4, the insulating layer 4b is an insulating layer B in which both the electrode layer immediately over the insulating layer 4b and the electrode layer immediately under the insulating layer 4b are the positive electrode layer 1 (especially the positive electrode current collecting layer 11).

In each of the thick end portions 40x, 40y of the insulating layer 4b interposed between the second battery element 100B and the third battery element 100C, the thick end portion is increased toward the end face by gradually raising the upper face and the lower face toward the end face in the section view as illustrated in FIG. 4.

In the solid-state battery of the present embodiment, the following effects are obtained in addition to the effects obtained in the solid-state battery of the first embodiment.

The solid-state battery including three battery elements (the first battery element 100A, the second battery element 100B, and the third battery element 100C), the second battery element including two battery constituent units 10, and the third battery element 100C including four battery constituent units 10 can achieve a more sufficient high voltage of the solid-state state battery.

Fifth Embodiment

The solid-state battery of the present embodiment is the same as the solid-state battery of the first embodiment except that it has the following features.

Figure 5:
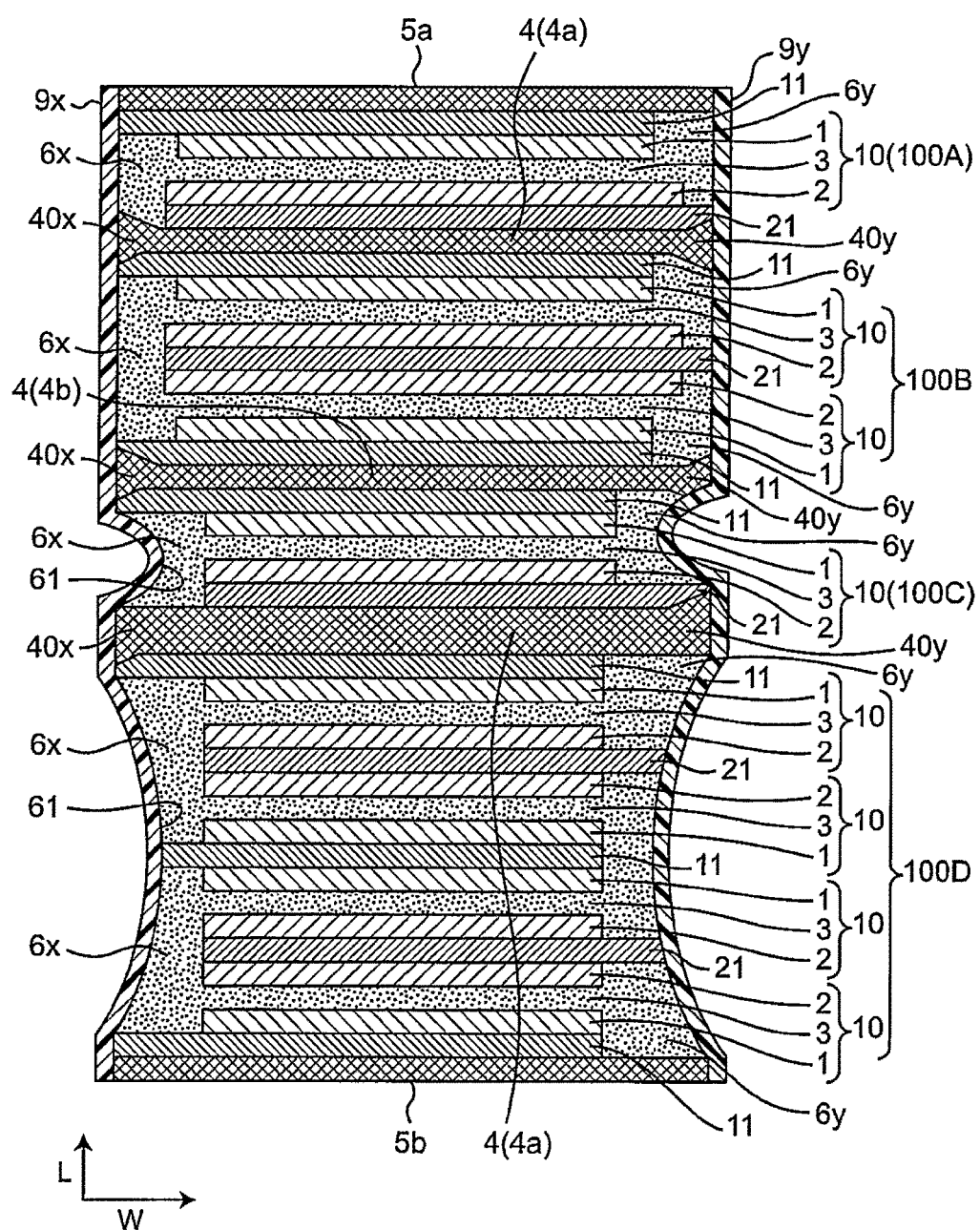
FIG. 5 is a schematic sectional view of a solid-state battery according to a fifth embodiment of the present invention.

As illustrated in FIG. 5, the solid-state battery includes the first battery element 100A, the second battery element 100B, the third battery element 100C, and a fourth battery element 100D in order from the top. FIG. 5 is a schematic sectional view of the solid-state battery according to a fifth embodiment of the present invention.

The second battery element includes two battery constituent units 10.

The third battery element 100C includes one battery constituent unit 10 and has a curve on the outer peripheral face 61 of the side face reinforcing parts 6x, 6y.

The fourth battery element 100D includes four battery constituent units 10 and has a curve on the outer peripheral face 61 of the side face reinforcing parts 6x, 6y.

The insulating layer 4 interposed between the second battery element 100B and the third battery element 100C corresponds to the insulating layer B (4b). As described above, the insulating layer B is an insulating layer in which the electrode layer immediately over the insulating layer B has the same polarity as the polarity of the electrode layer immediately under the insulating layer B. In FIG. 5, the insulating layer 4b is an insulating layer B in which both the electrode layer immediately over the insulating layer 4b and the electrode layer immediately under the insulating layer 4b are the positive electrode layer 1 (especially the positive electrode current collecting layer 11).

In each of the thick end portions 40x, 40y of the insulating layer 4b interposed between the second battery element 100B and the third battery element 100C, the thickness of the thick end portion is increased toward the end face by gradually raising the upper face and the lower face toward the end face in a section view as illustrated in FIG. 5. When the side face reinforcing part 6 (for example, 6y) has a curve, the maximum thickness t of the thick end portion 40y in the vicinity of the curve is the maximum thickness t when it is assumed that the side face reinforcing part 6 does not have a curve as in the third embodiment.

The insulating layer 4 interposed between the third battery element 100C and the fourth battery element 100D corresponds to the insulating layer A (4a). As described above, the insulating layer A is an insulating layer in which the electrode layer immediately over the insulating layer A has a polarity different from the polarity of the electrode layer immediately under the insulating layer A. In FIG. 5, in the insulating layer 4a between the third battery element 100C and the fourth battery element 100D, the electrode layer immediately over the insulating layer 4a is the negative electrode layer 2 (especially the negative electrode current collecting layer 21), and the electrode layer immediately under the insulating layer 4a is the positive electrode layer 1 (especially the positive electrode current collecting layer 11).

In each of the thick end portions 40x, 40y of the insulating layer 4 interposed between the third battery element 100C and the fourth battery element 100D, the thickness of the thick end portion is increased toward the end face by gradually raising only one of the upper face or the lower face toward the end face in a section view as illustrated in FIG. 5.

In the solid-state battery of the present embodiment, the following effects are obtained in addition to the effects obtained in the solid-state battery of the first embodiment.

The solid-state battery including four battery elements (the first battery element 100A, the second battery element 100B, the third battery element 100C, and the fourth battery element 100D), the second battery element including two battery constituent units 10, and the fourth battery element 100D including four battery constituent units 10 can achieve a more sufficient high voltage of the solid-state battery.

The side face reinforcing part 6 (6x, 6y) of the third battery element 100C and the fourth battery element 100D having a curve on the outer peripheral face 61 can absorb the expansion by using the curve if the solid-state battery expands in the width direction W due to charging and discharging.

Sixth Embodiment

The solid-state battery of the present embodiment is the same as the solid-state battery of the first embodiment except that it has the following features.

The electrode layer immediately over and/or immediately under the insulating layer having the thick end portion 40

Figure 6:
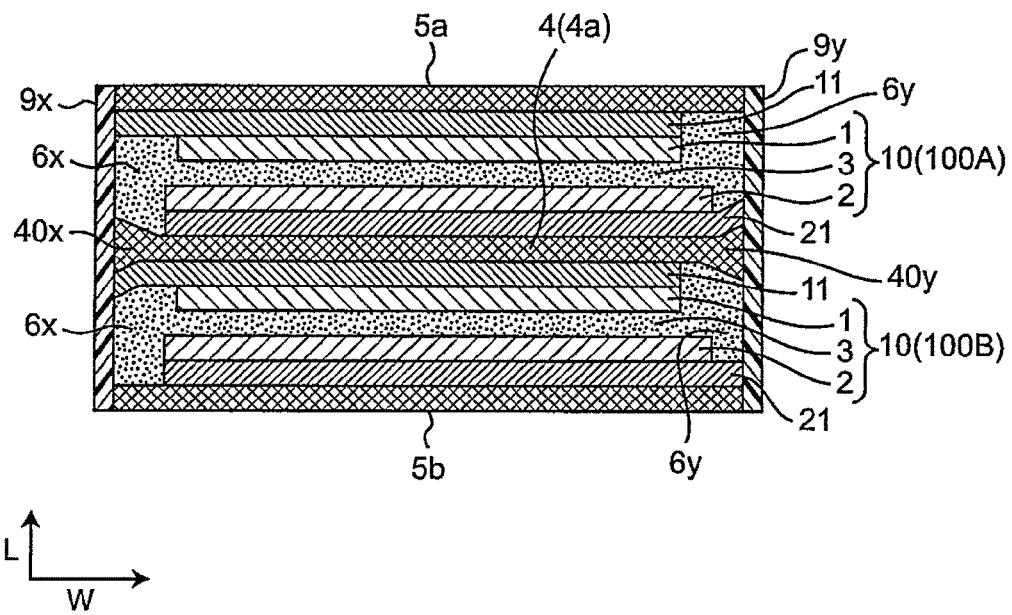
FIG. 6 is a schematic sectional view of a solid-state battery according to a sixth embodiment of the present invention.
Figure 6:
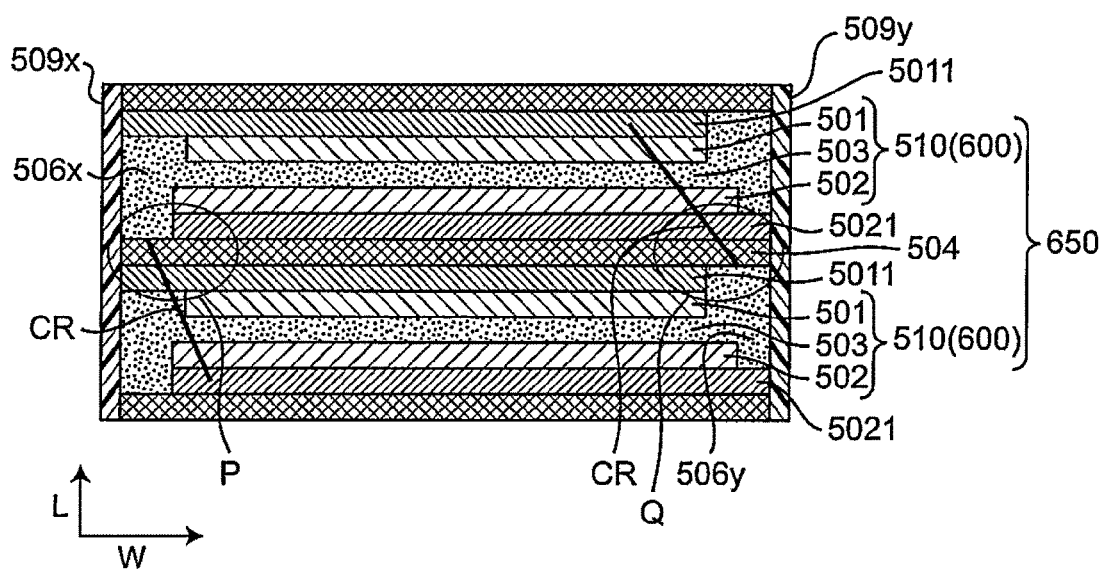

(40x, 40y) is formed along the raise on the upper face and/or the lower face of the thick end portion 40 (40x, 40y) while being in contact with the thick end portion 40 (40x, 40y). FIG. 6 is a schematic sectional view of the solid-state battery according to a sixth embodiment of the present invention.

For example, as illustrated in FIG. 6, the electrode layer (for example, the positive electrode layer 1, especially the positive electrode current collecting layer 11) immediately under the insulating layer 4a having the thick end portion 40x is formed along the raise on the lower face of the thick end portion 40x while being in contact with the thick end portion 40x.

For example, as illustrated in FIG. 6, the electrode layer (for example, the negative electrode layer 2, especially the negative electrode current collecting layer 21) immediately over the insulating layer 4a having the thick end portion 40y is formed along the raise on the upper face of the thick end portion 40y while being in contact with the thick end portion 40y.

In the solid-state battery of the present embodiment, the following effects are obtained in addition to the effects obtained in the solid-state battery of the first embodiment.

Electrical connection to the end face electrode of the electrode layer immediately over the insulating layer and/or the end face electrode of the electrode layer immediately under the insulating layer with the thick end portion 40 (40x, 40y) can be achieved more reliably.

Method for Manufacturing Solid-State Battery

The solid-state battery of the present invention can be manufactured by a printing method such as a screen-printing method, a green sheet method using a green sheet, or a combined method thereof. Hereinafter, the case of adopting the printing method will be described in detail, but it is obvious that the method is not limited thereto.

A method for manufacturing a solid-state battery of the present invention includes: a step of forming an unfired stacking body by a printing method; and a step of firing the unfired stacking body.

Step of Forming Unfired Stacking Body

In this step, an unfired stacking body having a predetermined structure is formed on a substrate by a printing method using several types of pastes as inks, such as a positive electrode layer paste, a negative electrode layer paste, a positive electrode current collecting layer paste, a negative electrode current collecting layer paste, a solid electrolyte layer paste, an insulating layer paste, a protective layer paste, a paste for the side face reinforcing part, a paste for a cavity portion, and a paste for the end face electrode. The paste for a cavity portion is a paste for forming a cavity portion at the thick end portion of the insulating layer 4 and is a paste for forming a portion where is burned out by sintering. The paste for a cavity portion can also be used as a paste for a curved portion.

The paste can be prepared by wet mixing a predetermined constituent material of each layer selected from the group consisting of a positive electrode active material, a negative electrode active material, an electron conductive material, a solid electrolyte material, an insulating substance, and a sintering agent with an organic vehicle in which an organic material is dissolved in a solvent.

For example, the positive electrode layer paste contains a positive electrode active material, an electron conductive material, a solid electrolyte material, an organic material, and a solvent.

For example, the negative electrode layer paste contains a negative electrode active material, an electron conductive material, a solid electrolyte material, an organic material, and a solvent.

For example, the positive electrode current collecting layer paste and the negative electrode current collecting layer paste contain an electron conductive material, a sintering agent, an organic material, and a solvent.

For example, the solid electrolyte layer paste contains a solid electrolyte material, a sintering agent, an organic material, and a solvent.

For example, the insulating layer paste contains an insulating substance, an organic material, and a solvent.

For example, the protective layer paste contains an insulating substance, an organic material, and a solvent.

For example, the paste for the side face reinforcing part contains a solid electrolyte material (and/or an insulating material), a sintering agent, an organic material, and a solvent.

For example, the paste for a cavity portion and the paste for a curved portion contain an organic material and a solvent.

For example, the paste for the end face electrode contains an electron conductive material, a sintering agent, an organic material, and a solvent.

The organic material contained in the pastes is not particularly limited, and a polymer compound such as a polyvinyl acetal resin, a cellulose resin, a polyacrylic resin, a polyurethane resin, a polyvinyl acetate resin, or a polyvinyl alcohol resin can be used.

The solvent is not particularly limited as long as the organic material can be dissolved, and for example, toluene, ethanol, or the like can be used.

In the wet mixing, a medium can be used, and specifically, a ball mill method, a viscomill method, or the like can be used. A wet mixing method without using a medium may also be used, and a Sandoz mill method, a high-pressure homogenizer method, a kneader dispersion method, or the like can be used.

The substrate is not particularly limited as long as it can support the unfired stacked body, and for example, a polymer material such as polyethylene terephthalate can be used. When the unfired stacked body is subjected to a firing step while being held on a substrate, a substrate having heat resistance to a firing temperature is used.

At the time of printing, printed layers are sequentially stacked in a predetermined thickness and pattern shape, and an unfired stacked body corresponding to the structure of a predetermined solid-state battery is formed on the substrate. Specifically, when the solid-state battery of FIG. 1A is manufactured, for example, a plurality of printing layers are sequentially stacked in a predetermined thickness and pattern shape in order from a lower layer. When each printed layer is formed, a drying treatment (that is, evaporation treatment of solvent) is performed.

In particular, when the thick end portion of the insulating layer is formed, the thickness can be increased gradually or stepwise by reducing the thickness of each printed layer and performing stacking.

When the thick end portion of the insulating layer has a cavity portion, a printed layer formed of the paste for a cavity portion may be formed at a portion corresponding to the cavity portion. When the side face reinforcing part has a curved portion, a printed layer formed of the paste for a curved portion may be formed at a portion corresponding to the recess in the curved portion. In such a case, the curve depth can be gradually increased or decreased by reducing the thickness of each printed layer and stacking the layers.

After the unfired stacked body is formed, the unfired stacked body may be peeled off from the substrate and subjected to the firing step, or the unfired stacked body may be subjected to the firing step while being held on the substrate.

Firing Step

The unfired stacked body is subjected to firing. The firing is performed by removing the organic material at, for example, 500° C. in a nitrogen gas atmosphere containing oxygen gas, and then heating the stacked body at, for example, 550° C. to 1000° C. in a nitrogen gas atmosphere. The firing may be usually performed while pressurizing the unfired stacked body in the stacking direction L (in some cases, the stacking direction L and a direction perpendicular to the stacking direction L (width direction W and/or depth direction (for example, the front and back direction on the paper surface of FIG. 1A)). The pressure is not particularly limited, and may be, for example, 1 kg/cm² to 1000 kg/cm², particularly 5 kg/cm² to 500 kg/cm².

In a method for forming the filling portion of the constituent material of the end face electrode in the thick end portion of the insulating layer, first, the unfired stacked body is formed by the same method as described above except that the end face electrode is not provided and the paste for a cavity portion is not used. Subsequently, the cavity portion can be formed by digging down the inside from the end face of the thick end portion in the unfired stacked body. Next, the end face electrode is formed using, for example, the paste for the end face electrode or the like, whereby the cavity portion is filled with the constituent material of the end face electrode, and then subjected to firing, whereby the filling portion of the constituent material of the end face electrode can be formed at the thick end portion of the insulating layer.

The solid-state battery of the present invention can be used in various fields. By way of example only, the solid-state battery of the present invention can be used in the field of electronics mounting. The solid-state battery of the present invention can also be used in the fields of electricity, information, and communication in which mobile devices and the like are used (for example, electric and electronic equipment fields or mobile equipment fields including mobile phones, smartphones, notebook computers, and small electronic machines such as digital cameras, activity meters, arm computers, electronic papers, RFID tags, card-type electronic money, and smartwatches), home and small industrial applications (for example, the fields of electric tools, golf carts, and home, nursing, and industrial robots), large industrial applications (for example, the fields of forklift, elevator, and harbor crane), transportation system fields (for example, the fields of hybrid vehicles, electric vehicles, buses, trains, power-assisted bicycles, electric two-wheeled vehicles, and the like), power system applications (for example, fields such as various types of power generation, road conditioners, smart grids, and household power storage systems), medical applications (medical device fields such as hearing aid buds), medical applications (fields such as dosage management systems), IoT fields, space and deep sea applications (for example, fields such as a space probe and a submersible), and the like.

DESCRIPTION OF REFERENCE SYMBOLS

1: Positive electrode layer
2: Negative electrode layer
3: Solid electrolyte layer
4:4a:4b: Insulating layer
5:5a:5b: Protective layer
6:6x:6y: Side face reinforcing part
9:9x:9y: End face electrode
10: Battery constituent unit
11: Positive electrode current collecting layer
21: Negative electrode current collecting layer
100:100A:100B:100C:100D: Battery element

The invention claimed is:

1. A solid-state battery comprising:
two or more stacked battery elements, each battery element including one or more battery constituent units in which a positive electrode layer and a negative electrode layer oppose each other with a solid electrolyte layer between the positive electrode layer and the negative electrode layer; and
an insulating layer interposed between adjacent battery elements of the two or more stacked battery elements, wherein at least one end portion of the insulating layer has a thickness greater than a thickness of a central portion of the insulating layer in a sectional view thereof,
wherein the at least one end portion of the insulating layer has a width length r of 1% to 10% of a total width R of the insulating layer in the section view thereof, and
wherein the at least one end portion of the insulating layer has a maximum thickness t of 120% to 300% of a thickness T of the central portion in the section view thereof.

2. The solid battery according to claim 1, further comprising:
a first end face electrode electrically connected to the positive electrode layer on a first side face of a stacked body of the two or more stacked battery elements; and
a second end face electrode electrically connected to the negative electrode layer on a second side face of the stacked body, the second side face opposing the first side face, wherein
the at least one end portion of the insulating layer is in contact with at least one of the first and second end face electrodes.

3. The solid-state battery according to claim 1, wherein both opposed end portions of the insulating layer have a thickness greater than the thickness of the central portion of the insulating layer.

4. The solid-state battery according to claim 1, wherein the thickness of the at least one end portion of the insulating layer increases gradually or stepwise toward an end face of the insulating layer.

5. The solid-state battery according to claim 4, wherein the insulating layer includes a cavity portion with an opening in the end face.

6. The solid-state battery according to claim 1, wherein, among the positive electrode layer and the negative electrode layer, a first electrode layer immediately on a first side of the insulating layer and a second electrode layer immediately on a second side of the insulating layer have polarities different from each other or have a same polarity.

7. The solid-state battery according to claim 1, wherein
among the positive electrode layer and the negative electrode layer, a first electrode layer immediately on a first side of the insulating layer and a second electrode layer immediately on a second side of the insulating layer have polarities different from each other,
the thickness of the at least one end portion increases from a first raised point on an upper face and/or increases from a second raised point on a lower face of the at least one end portion gradually or stepwise toward an end face of the insulating layer, and the first raised point on the upper face is covered with the first electrode layer immediately on the first side and/or the second raised point on the lower face is covered with the second electrode layer immediately on the second side in the section view thereof.

8. The solid-state battery according to claim 1, wherein the insulating layer is in direct contact with a battery element of the two or more stacked battery elements on each of first and second opposed faces of the insulating layer.

9. The solid-state battery according to claim 1, wherein the insulating layer is an integrally sintered layer with a battery element of the two or more stacked battery elements on each of first and second opposed faces of the insulating layer.

10. The solid-state battery according to claim 1, wherein all layers of each battery element are a sintered body and are joined between two adjacent layers of the all layers of that battery element.

11. The solid-state battery according to claim 1, wherein the insulating layer includes an insulating inorganic substance.

12. The solid-state battery according to claim 11, wherein the insulating inorganic substance includes one or more materials selected from quartz glass, composite oxide-based glass, alumina, cordierite, mullite, steatite, spinel, and forsterite.

13. The solid-state battery according to claim 1, wherein the insulating layer includes an insulating inorganic substance having an ion conductivity of $1\times10^{-7}$ S/cm or less.

14. The solid-state battery according to claim 1, wherein the insulating layer includes an insulating inorganic substance having an electron conductivity of $1\times10^{-7}$ S/cm or less.

15. The solid-state battery according to claim 1, wherein the positive electrode layer and the negative electrode layer are layers capable of occluding or releasing lithium ions.

16. The solid-state battery according to claim 1, wherein the thickness of the at least one end portion increases from a first raised point on an upper face of the insulating layer towards an end face of the insulating layer and increases from a second raised point on a lower face of the insulating layer towards the end face of the insulating layer, the first raised point and the second raised point being at different distances from the end face of the insulating layer.

17. The solid-state battery according to claim 16, wherein the end face is a first end face and the at least one end portion is a first end portion, and wherein a second end portion of the insulating layer opposite the first end portion has a thickness greater than the thickness of the central portion of the insulating layer in the sectional view thereof, the thickness of the second end portion increases from a third raised point on the upper face of the insulating layer towards a second end face of the insulating layer and increases from a fourth raised point on the lower face of the insulating layer towards the second end face of the insulating layer, the third raised point and the fourth raised point being at different distances from the second end face of the insulating layer.

18. The solid-state battery according to claim 1, wherein the thickness of the at least one end portion increases from a first raised point on an upper face of the insulating layer towards an end face of the insulating layer and increases from a second raised point on a lower face of the insulating layer towards the end face of the insulating layer, the first raised point and the second raised point being at a same distance from the end face of the insulating layer.

* * * * *